Figure 1:
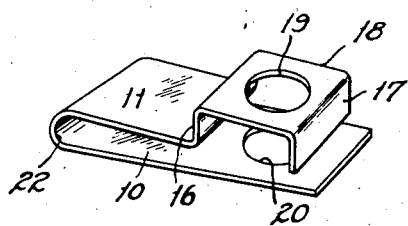
Figure 5:
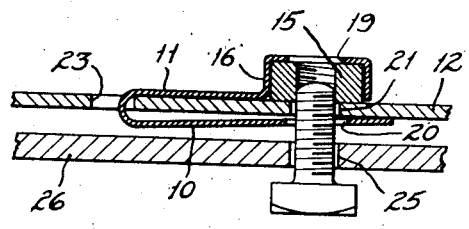

May 23, 1939.   G. A. TINNERMAN   2,159,573
FASTENING DEVICE
Filed July 31, 1936

INVENTOR.
GEORGE A. TINNERMAN
BY Bates, Golrick, & Teare
ATTORNEYS

Patented May 23, 1939

2,159,573

UNITED STATES PATENT OFFICE 2,159,573

FASTENING DEVICE

George A. Tinnerman, Rocky River, Ohio, assignor to Albert H. Tinnerman, Cleveland, Ohio Application July 31, 1936, Serial No. 93,679

6 Claims. (Cl. 85—32)

This invention relates to fastening devices and particularly to a device for holding a nut firmly in position for receiving a threaded bolt. There are many instances, especially in blind locations, where a standard nut is desired, but where the operator either cannot hold it in place while the bolt is being inserted, or cannot thereafter hold it against rotation during the final tightening operation.

An effort has been made to retain a nut in bolt receiving position by welding it to one of the parts, but such method is not only expensive, but is objectionable in that the nut cannot be moved a slight distance to compensate for misalignment of the openings in the two parts that are to be connected together.

An object of the present invention is to make a fastener which can be readily attached to one of the parts to be joined and which will be so formed that it will hold the nut firmly in bolt receiving position. The attachment may take any one of several different forms, but in each case it comprises a clip which is frictionally held by spring tension onto one of the parts, and in each case, has provision thereon for holding a nut against rotation.

In the drawing, Figs. 1, 2, 3 and 4 are perspective views of different forms which the fastening device may have, while Figs. 5, 6, 7 and 8 are vertical sections taken through the devices shown in Figs. 1 to 4, respectively, each fastener being shown in the latter group in connection with a bolt nut and two parts to be joined together.

Figure 2:
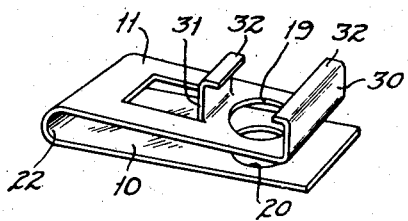
Figure 6:
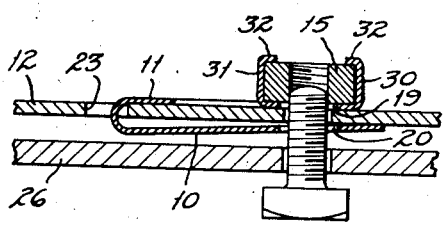
Figure 3:
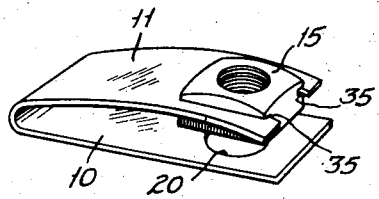
Figure 7:
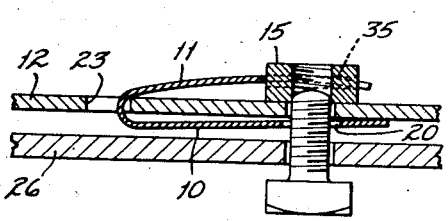

Each of the fasteners which are illustrated in Figs. 1, 2 and 3 comprises a clip that is formed from a flat sheet-metal strip that is bent upon itself to make a lower arm 10 and an upper arm 11, the two arms being spaced apart a sufficient distance to admit one of the parts to be joined, which is indicated, for example, at 12. The clip is so formed that the arms must be spread apart slightly to admit the article 12, wherefore the normal tendency of the arms to approach each other will hold the fastener by spring tension upon the article. One of the arms of each clip, preferably the upper arm, has provision thereon for yieldably holding a standard nut indicated at 15.

In Fig. 1, the nut retaining means comprises a channel-shaped holder, which is formed from the arm 11 and which has vertical walls 16 and 17, and a connecting web 18. The channel opens downwardly and has a bolt receiving opening 19, the diameter of which is larger than the outside diameter of the bolt thread so as to clear it when the bolt is inserted in the normal way. Similarly, the bottom layer 10 has a bolt receiving opening 20 in registration with the opening 19, and of sufficient size to clear the thread on the bolt.

Where the bolt opening 21 in the article 12 can be located near the marginal edge of the article, then the clip is so made that the shoulder 22, which is formed at the junction of the arms 10 and 11, engages the marginal edge of the piece at the time the openings 19 and 20 are in registration with the opening 21. Where the opening 21, however, is not close to a marginal edge, then a slot 23 is made in the article, through which the arm 10 may be inserted, after the nut 15 has first been positioned between the walls of the channel shaped retainer. It will be understood that the slot 23 is spaced sufficiently far from the opening 21 to cause substantial alignment between the axis of the opening in the nut, and that of the opening 21 when the bent portion 22 of the clip is positioned within the slot. It is also to be understood that the slot is sufficiently wide to allow a slight adjustment of the nut to compensate for any misalignment that may occur in production between the opening 12 and the opening 26 in the part 26.

The fastener, which is shown in Fig. 2, is somewhat similar to that shown in Fig. 1, except for the fact that the retaining means for the nut comprises two upstanding walls 30 and 31, each of which has an inturned flange 32. The wall 30 may be bent upwardly from the end of the arm 11, while the wall 31 may be bent upwardly from the body portion of the arm 11, the distance between the walls being slightly less than the width of the nut, whereby the nut will be held therein by spring tension. In this illustration the arm 11 has a bolt receiving opening 19 in registration with the corresponding opening 20 in the arm 10.

In the modification of Fig. 3, the free end of the arm 11 is bifurcated, and the nut has slots 35 on its opposing faces into which the forked ends of the arm 11 extend. The slots and forked ends of the arm 11 have a snug interfitting relationship by means of which the nut is held by spring tension in bolt receiving position. In this modification the lower arm 10 has a bolt receiving opening 20 in alignment with the opening in the nut.

Figure 4:
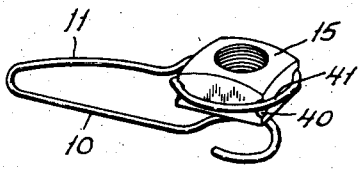
Figure 8:
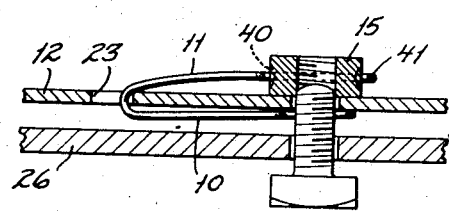

In Fig. 4 I have shown a further modification in which the fastener is made of a strip of wire that is bent upon itself to provide a lower arm 10 and an upper arm 11. The free end of the upper arm is bent around the nut and is fitted into notches 40 on the vertical edges of the nut.

Similarly the lower arm is bent to provide a bolt receiving opening and to assure a flat bearing surface against the under side of the article to which it is attached. It is to be understood that the fastener of Fig. 4 is so formed that the nut encircling portion 41 is smaller than the nut. Consequently, the encircling portion must be opened slightly to admit the nut, after which the spring tension in the wire holds the nut firmly in place.

From the foregoing description, it will be apparent that I have devised a fastener that can be economically made and that will operate in a satisfactory manner to position a standard nut in place for receiving a threaded bolt. It will also be apparent that the fastener not only holds the nut in bolt receiving position, but also holds it against rotation during the tightening operation.

I claim:

1. Means for holding a nut in bolt-receiving position upon a part to be joined, comprising a metallic clip having two arms adapted to be disposed on opposite sides of the part to be joined, one of the arms having walls extending out of the plane thereof for contacting and holding a nut with the axis of the nut extending transversely to the arm, and the other arm having a bolt-receiving opening in registration with the opening in the nut.

2. Means for holding a nut in bolt-receiving position comprising a flexible clip having two arms adapted to be disposed on opposite sides of the part to be joined, one of the arms having a pair of walls integral therewith and extending transversely of the arm and out of the plane thereof for contacting the opposite faces of a nut, and for holding it solely by spring tension in bolt-receiving position.

3. A device of the class described, comprising a U-shaped clip, one arm of the U having two walls struck upwardly therefrom and each wall having an inturned flange, the walls being adapted to engage and hold a nut in bolt-receiving position on the clip.

4. A nut holder, comprising a U-shaped metallic clip, one arm of the clip having means thereon for engaging and holding a nut by spring tension, and the other arm of the clip being bent backwardly upon the first-named arm to contact an article and to be held thereon solely by spring tension of the metal of which the clip is made.

5. A nut holder, comprising a clip having two arms adapted to be disposed on opposite sides of an article, one of the arms having a downwardly facing channel-shaped portion formed integrally therewith for receiving and holding a nut therein.

6. A nut holder comprising a U-shaped metallic clip having a bolt receiving opening therein and having a pair of ears formed integrally therewith and disposed on opposite sides of the opening, said ears extending substantially parallel to each other and being adapted to engage the opposite sides of a nut for centering it with reference to the opening and for holding it in bolt receiving position.

GEORGE A. TINNERMAN.